United States Patent
Noldus et al.

(10) Patent No.: US 8,301,111 B2
(45) Date of Patent: Oct. 30, 2012

(54) METHOD OF AND SYSTEM FOR SETTING UP A TELEPHONE CALL

(75) Inventors: Rogier August Caspar Joseph Noldus, Goirle (NL); Marco Zuurveld, Rijen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 824 days.

(21) Appl. No.: 12/091,964

(22) PCT Filed: Nov. 1, 2005

(86) PCT No.: PCT/NL2005/050029
§ 371 (c)(1),
(2), (4) Date: Oct. 8, 2008

(87) PCT Pub. No.: WO2007/053004
PCT Pub. Date: May 10, 2007

(65) Prior Publication Data
US 2009/0215428 A1    Aug. 27, 2009

(51) Int. Cl.
H04M 11/04    (2006.01)
(52) U.S. Cl. .................. 455/404.2; 455/404.1; 455/455; 455/456.1; 455/456.2; 455/566
(58) Field of Classification Search ............... 455/404.1, 455/404.2, 417, 445, 566, 456.1, 456.2, 456.3
See application file for complete search history.

(56) References Cited

U.S. PATENT DOCUMENTS

| | | | |
|---|---|---|---|
| 5,249,223 A * | 9/1993 | Vanacore | 379/266.06 |
| 6,463,289 B1 | 10/2002 | Havinis et al. | |
| 6,968,044 B2 * | 11/2005 | Beason et al. | 379/45 |
| 7,042,985 B1 * | 5/2006 | Wright | 379/45 |
| 7,107,055 B2 * | 9/2006 | Gallagher et al. | 455/436 |
| 2003/0222819 A1 | 12/2003 | Karr et al. | |
| 2004/0105529 A1 | 6/2004 | Salvucci et al. | |
| 2004/0180655 A1 | 9/2004 | Jang et al. | |
| 2004/0184584 A1 | 9/2004 | McCalmont et al. | |
| 2005/0123102 A1 | 6/2005 | Beason et al. | |
| 2005/0192035 A1* | 9/2005 | Jiang | 455/461 |
| 2007/0004378 A1* | 1/2007 | Muhonen | 455/404.2 |

* cited by examiner

Primary Examiner — Kathy Wang-Hurst

(57) ABSTRACT

A system with a mobile switching center (MSC), a service control point (SCP) and an emergency center (EC). The mobile switching center (MSC) sets up a call between a mobile station (2(i)) and the emergency center (EC), sends first data including raw location data as to where the mobile station (2(i)) is located to the emergency center (EC), and sends a service invocation to the service control point (SCP) to invoke an Intelligent Network service to start searching for second data relating to the mobile station, including more accurate location data as to where the mobile station is located. The service control point (SCP) receives the service invocation, starts the Intelligent Network service to search for the second data and sends the second data to the emergency center (EC) once said second data becomes available.

19 Claims, 3 Drawing Sheets

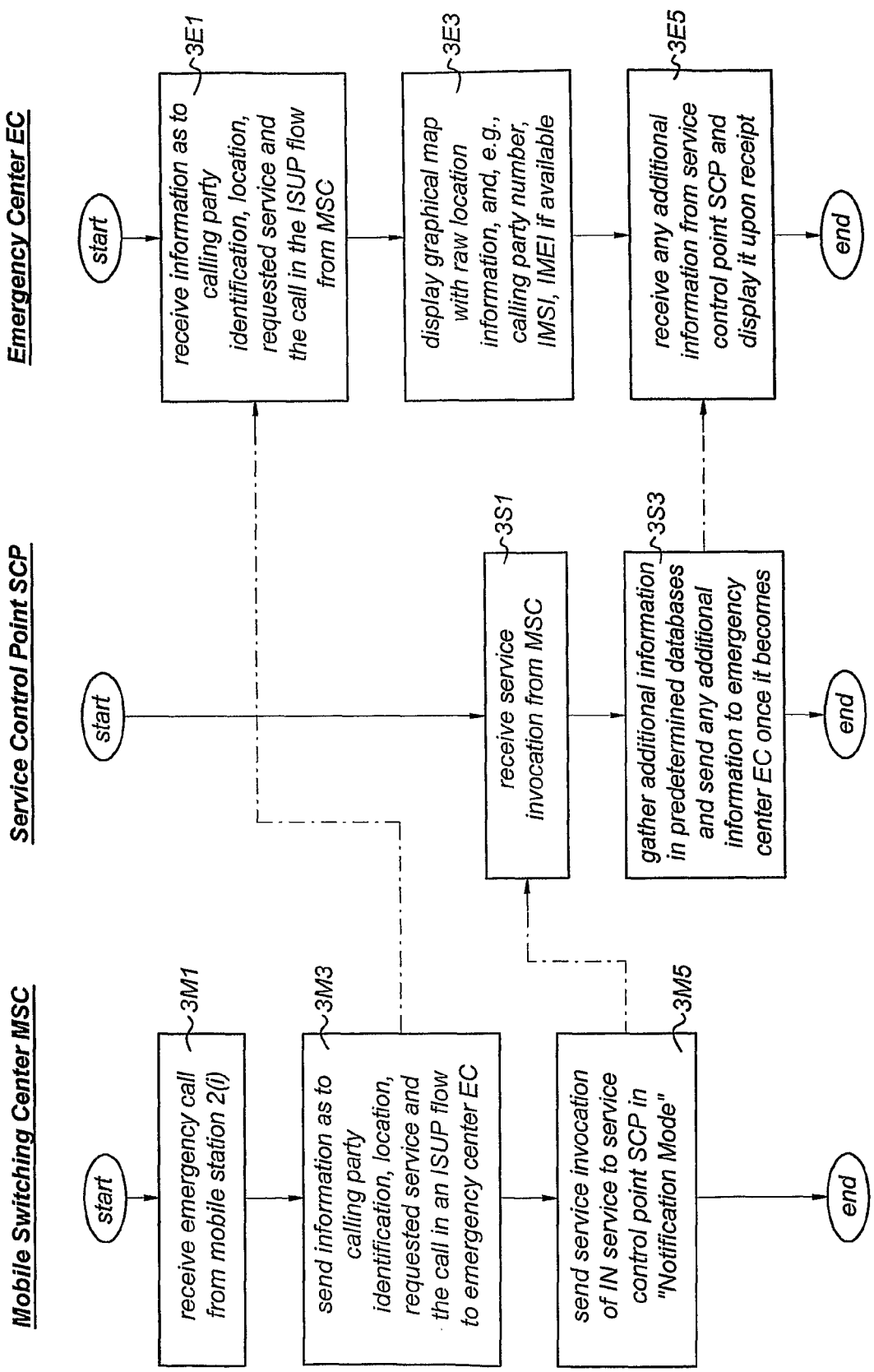

METHOD OF AND SYSTEM FOR SETTING UP A TELEPHONE CALL

FIELD OF THE INVENTION

The present invention relates to a method and a system for setting up a telephone call between a mobile station and an emergency center.

BACKGROUND OF THE INVENTION

Nowadays, within mobile communication networks like the GSM network (=Global System for Mobile communications), emergency calls may be established between a mobile station and an emergency center. In the GSM network the emergency call has, amongst others, the following characteristics:
- a dedicated GSM Basic Service is used for the emergency call. This GSM Basic Service is TeleService 12 or "TS 12". Reference is made to 3GPP TS 22.003 [1] for an overview of TeleServices;
- the emergency call is established with a predefined number, such as 112, 911, etc. Prior art as to emergency call establishment procedures can be found in 3GPP TS 22.101 [2];
- the emergency call may be established even when the mobile station is not registered with the mobile network;
- the emergency call may be established when the mobile station is locked or when the mobile station does not have a SIM card (SIM=Subscriber Identification Module);
- the emergency call bypasses certain regular call handling procedures in the mobile switching center that is used to set up the emergency call between the mobile station and the emergency center, such as subscription check, call barring checks, etc.;
- the emergency call is routed to the nearest emergency center. The mobile switching center processes the emergency call with high priority.

SUMMARY OF THE INVENTION

It is an object of the present invention to provide the operators within the emergency center with more information about the mobile station used for setting up the emergency call, such information including, but not limited to, accurate location information of the mobile station at the time the emergency call is established.

To that end the present invention provides a method of setting up a telephone connection for a telephone call, comprising:
- setting up said telephone connection for said telephone call between a mobile station and an emergency center;
- sending first data including at least raw location data as to where said mobile station is located to said emergency center via said telephone connection;
- displaying said first data to an operator in said emergency center;
- invoking an Intelligent Network service to start searching for second data relating to said mobile station, including more accurate location data as to where said mobile station is located;
- sending said second data from said Intelligent Network service to said emergency center once said second data becomes available;
- displaying said second data to said operator in said emergency center once said second data is received.

With such a method, the emergency call can be established with minimal delay, such that the operator in the emergency center can directly view the first data on, e.g., a monitor in the emergency center. This first data already includes raw location data as to where the mobile station is located at the time the call is set up. However, during the telephone call, the Intelligent Network service will obtain more accurate location data as to where the mobile station is located and will send this information to the emergency center too. Once it is received there, this second data including the more accurate location data, will be shown on, e.g., a monitor in the emergency center. This greatly helps the operator to guide, e.g., ambulance staff, policemen and firemen to the location where the mobile station is and where, probably, acute help is needed.

In an embodiment of the invention, the method comprises invoking the Intelligent Network service in a notification mode such that the Intelligent Network service is unable to control the telephone connection between the mobile station and the emergency center. By preventing that the Intelligent Network service controls the telephone connection between the mobile station and the emergency center, it is assured that the establishment of the call to the emergency center suffers only minimal delay.

In a further embodiment, the invention relates to a method, wherein the invoking of the Intelligent Network service comprises sending at least one of the following to the Intelligent Network service:
- an International Mobile Equipment Identifier associated with the mobile station;
- an International Mobile Subscriber Identifier associated with the mobile station;
- a Mobile Subscriber ISDN associated with the mobile station;
- a Global Call Reference Number associated with the telephone call;
- an address of a mobile switching center that has set up the telephone connection;
- the raw location data.

In this further embodiment, the Intelligent Network service may be arranged to perform at least one of the following functions:
- to search for the more accurate location data using at least one of the Mobile Subscriber ISDN, the International Mobile Subscriber Identification, the International Mobile Equipment Identification and the address of the mobile switching center;
- to search for home operator information associated with the mobile station using at least one of the Mobile Subscriber ISDN and the International Mobile Subscriber Identification;
- to search for an International Mobile Equipment Identification status of the mobile station using the International Mobile Equipment Identification;
- to search for a fraud status of the Mobile Subscriber ISDN;
- to search for a name of a person registered as being owner of the mobile station using the Mobile Subscriber ISDN.

In a still further embodiment the first data comprises first identifying data and the second data comprises second identifying data, the first identifying data and the second identifying data being used in the emergency center to correlate the first data and the second data to one another.

This first identifying data and second identifying data may comprise a call reference number identifying the telephone call and an address of a mobile switching center that has set up the telephone connection.

The raw location data may comprise at least one of a location number, a cell global identifier and a service area identifier.

The invention also relates to a system for setting up a telephone connection for a telephone call, comprising a mobile switching center, a service control point and an emergency center, said mobile switching center being arranged to:
    set up said telephone connection for said telephone call between a mobile station and said emergency center;
    send a service invocation to said service control point to invoke an Intelligent Network service to start searching for second data relating to said mobile station, including more accurate location data as to where said mobile station is located;
    send first data including raw location data as to where said mobile station is located to said emergency center via said telephone connection.

said service control point being arranged to
    receive said service invocation from said mobile switching center;
    start said Intelligent Network service to search for said second data relating to said mobile station, including more accurate location data as to where said mobile station is located;
    send said second data from said Intelligent Network service to said emergency center once said second data becomes available;

said emergency center being arranged to:
    receive said first data and display said first data to an operator in said emergency center;
    receive said second data, correlate it to said first data and display said second data to said operator in said emergency center once said second data is received.

A mobile switching center, a service control point, and an emergency center, respectively, for use in such a system are claimed in further independent claims. Methods as performed within this mobile switching center, service control point and emergency center are also claimed in independent claims.

It is observed that the present invention is explained with reference to setting up an emergency call between a mobile station and an emergency center. However, it is to be understood, that "emergency center" is intended to refer to a center where operators are working who provide some kind of service to people that have set up a telephone connection with their mobile station and that wish to have some specific information or action to be done. In that sense, the operators in the "emergency center" can provide other types of services than emergency services, like help desk services of any desired kind. Thus, "emergency center" should be interpreted broadly as relating to any center where such kinds of services can be provided.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show:

FIG. 3 shows a flow chart of main actions performed in the system shown in FIG. 1 to set up the emergency call.

DETAILED DESCRIPTION OF EMBODIMENTS

Figure 1:
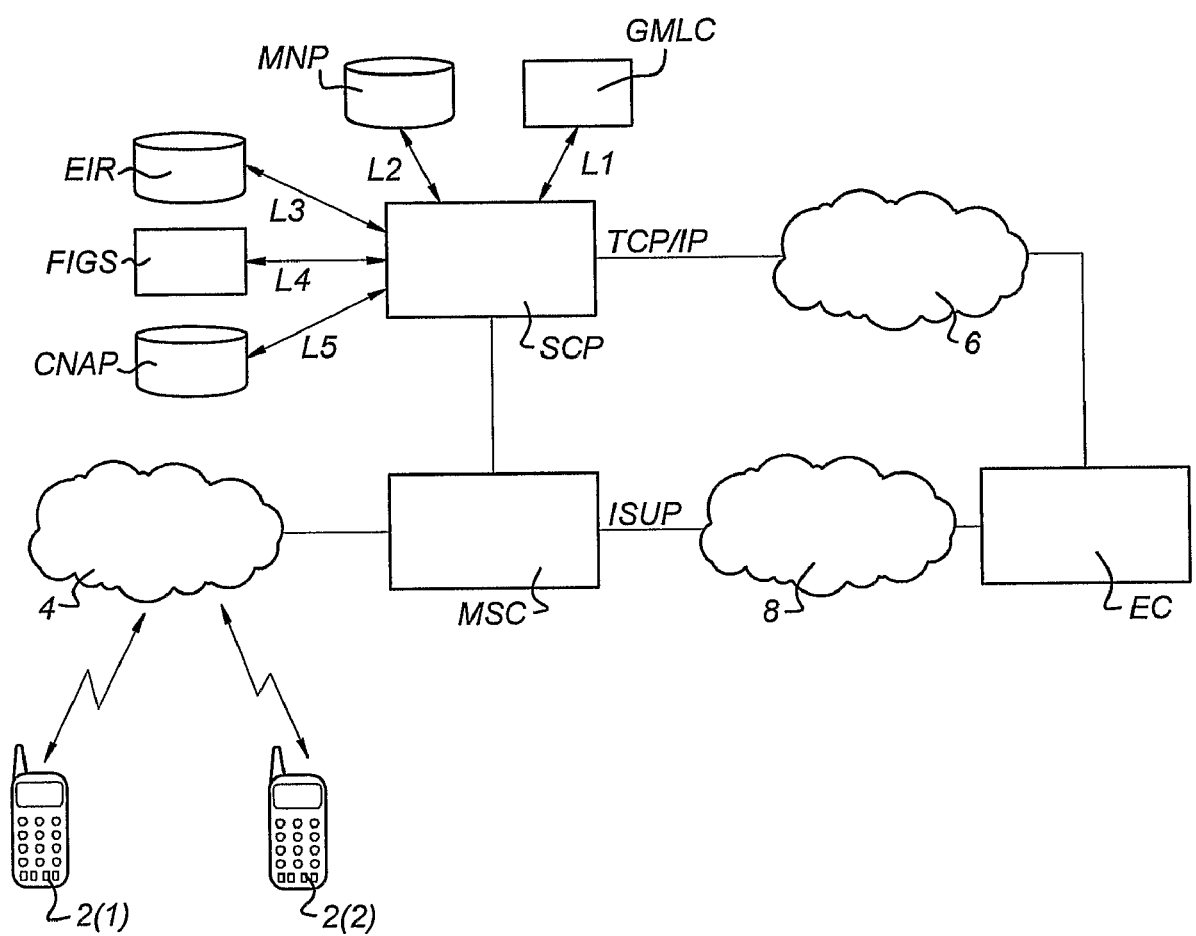
FIG. 1 shows a system for setting up an emergency call between a mobile station and an emergency center.

FIG. 1 shows a system for setting up an emergency call (or other telephone call) in accordance with the present invention. FIG. 1 shows a plurality of mobile stations 2(1), 2(2). Of course, there may be more such mobile stations 2(i), (i=1, 2, 3, . . . , I) that can be used for setting up an emergency call. FIG. 1 shows mobile telephones as mobile stations. However, it should be understood that "mobile station" is intended to include any kind of mobile device that is arranged for setting up a mobile telephone call, including laptops and personal digital assistance (PDA's).

The system comprises a mobile communication network 4 that allows a mobile connection to be made between the mobile station 2(i) and a mobile switching center MSC. The mobile switching center MSC is connected to a service control point SCP. Although FIG. 1 shows a fixed connection between the mobile switching center MSC and the service control point SCP, this connection can be wireless or via a communication network, as the case may be. The mobile switching center MSC is arranged to set up a telephone connection with an emergency center EC via a communication network 8. The communication network 8 may be the public switched telephone network PSTN or a public mobile land network PLMN.

The service control point SCP is arranged to set up a communication connection with the emergency center EC via a second network 6, which may be the Internet or any other suitable network.

Moreover, the service control point SCP is connected to a plurality of databases where an Intelligent Network IN service, as run on the service control point SCP, can search for additional data relating to the mobile station 2(i) that is setting up the emergency call with the emergency center EC. Via a first line L1, the service control point SCP is connected to a Gateway Mobile Location Centre GMLC. This GMLC center allows a location information query to be made providing very accurate location information as to the current position of the mobile station 2(i) used to set up the emergency call with the emergency center EC. To that end, as known to persons skilled in the art, the GMLC performs a current position measurement on the fly.

Via a second line L2, the service control point SCP is connected to a Mobile Number Portability MNP database. This MNP database allows a query to be made as to information regarding the home operator of the subscriber that is setting up the emergency call with the emergency center EC.

Via a third line L3, the service control point SCP is connected to an equipment identification register EIR. The EIR database allows a query to be made as to the status of the mobile station 2(i) itself, like whether it is black-listed (e.g., stolen), grey-listed or white-listed.

Via a fourth line L4, the service control point SCP is connected to a Fraud Information Gathering System FIGS, which allows a query to be made as to whether the user of the mobile station 2(i) is a fraud-listed user.

Via a fifth line L5, the service control point SCP is connected to a calling name presentation CNAP database, which allows a query to be made to the name of the subscriber of the mobile station 2(i).

The lines L1-L5 are shown as fixed lines. However, it should be understood that they represent communication connections to be made between the service control point SCP, the GMLC, the MNP database, the EIR database, the FIGS system, and the CNAP database, respectively. These lines L1-L5 may be implemented as fixed lines or as wireless connections, via suitable networks.

Figure 2:
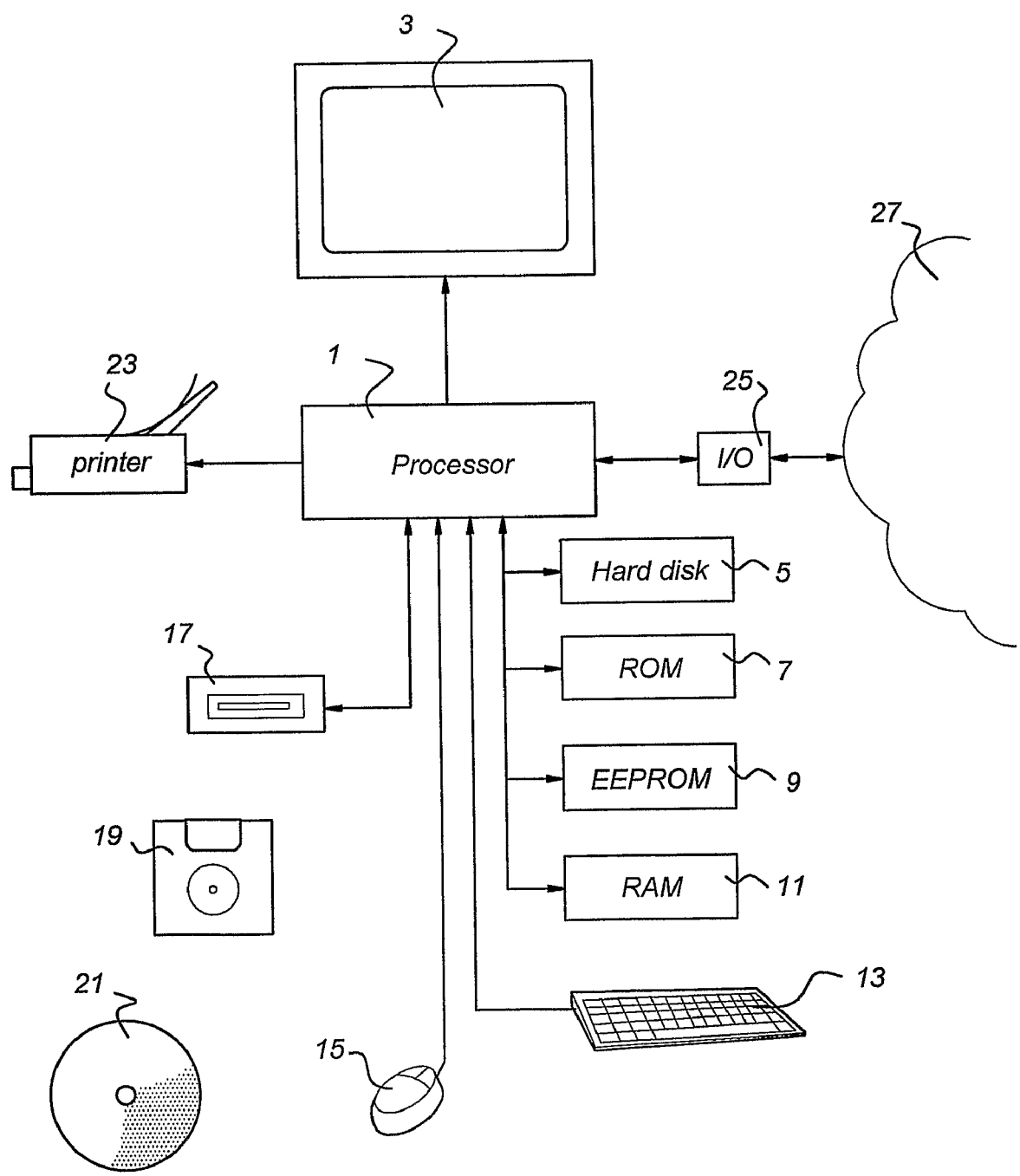
FIG. 2 shows components of a computer that can be used at several locations in the system shown in FIG. 1.

In FIG. 2, an overview is given of a computer arrangement that can be used to implement several functional units as shown in FIG. 1, such as the mobile switching center MSC, the service control point SCP, the emergency center EC, the Gateway Mobile Location Centre GMLC and the Fraud Information Gathering System FIGS. FIG. 2 is intended to show that all these functional units will have a processor and a memory storing data and instructions to provide the processor with the functionality as defined hereinafter. The other components shown in FIG. 2 may be present too to provide an operator with easy access to the processor and the memory content. FIG. 2 is not intended to limit the number and types of elements used to implement any of the systems mentioned, like the mobile switching center MSC, the service control point SCP, the emergency center EC, the GMLC and the fraud information center FIGS.

The arrangement shown in FIG. 2 comprises a processor 1 for carrying out arithmetic operations. The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to means for inputting instructions, data etc. by a user, like a keyboard 13, and a mouse 15. Other input means, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CDROM 21. Other data carriers may be tapes, DVD, etc. as is known to persons skilled in the art.

The processor 1 is also connected to a printer 23 for printing output data on paper, as well as to a display 3, for instance, a monitor or LCD (Liquid Crystal Display) screen, or any other type of display known to persons skilled in the art.

The processor 1 may be connected to one or more communication networks 27, for instance, the Public Switched Telephone Network (PSTN), a Local Area Network (LAN), a Wide Area Network (WAN), the Internet, etc. by means of I/O unit 25. The processor 1 is arranged to communicate with other communication arrangements through the network 27. The network 27 is intended as a general indication of any of the networks 4, 6, 8 of FIG. 1.

The data carrier 19, 21 may comprise a computer program product in the form of data and instructions arranged to provide the processor with the capacity to perform a method in accordance with the invention. However, such computer program product may, alternatively, be downloaded via the telecommunication network 27.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the network 27.

Now, setting up an emergency call in accordance with the present invention will be explained with reference to the flow chart of FIG. 3.

In action 3M1, the mobile switching center MSC receives an emergency call from a mobile station 2(i). To that end, the user of the mobile station 2(i) may call, e.g., the number 112, 911, 999, or any other number that is agreed to be used as an emergency telephone number. (However, it is to be understood that the invention is also applicable in other circumstances than setting up an emergency call. Thus, the invention is not restricted to using one of these emergency telephone numbers).

Once having received the emergency call from the mobile station 2(i), the mobile switching center MSC establishes a telephone connection between the mobile station 2(i)) and the emergency center EC via the communication network 8. The telephone connection between the mobile switching center MSC and the emergency center EC may use an ISDN User Part (ISUP) flow. In an embodiment, in action 3M3, the mobile switching center MSC is arranged to include the following information elements in this ISUP flow towards the emergency center EC:

- a Location Number LN that may be derived by the mobile switching center MSC from a Cell Global Identifier CGI (as used in 2G access networks) or from a Service Area Identifier SAI (as used in 3G access networks). The location number LN represents raw location information of the mobile station 2(i) by reflecting the mobile station's position as a number that forms part of a national numbering plan. Further information as to the use of the location number LN can be found in 3GPP TS 23.003 [3];
- Geodetic Information GI: the mobile switching center MSC derives this geodetic information GI from at least one of the location number LN, the Cell Global Identifier CGI and the Service Area Identifier SAI, e.g., by means of a so-called mapping table. This mapping table is associated with every local number LN, Cell Global Identifier CGI or Service Area Identifier SAI. The geodetic information GI is expressed in longitude, latitude and an uncertainty circle. A detailed description of geodetic information GI can be found in ITU-T Recommendation Q.763 [5];
- an International Mobile Equipment Identifier IMEI. This IMEI is a unique identification of the mobile equipment itself. This IMEI is received by the mobile switching center MSC from the mobile station 2(i). A definition of IMEI can be found in 3GPP TS 23.003 [3];
- an International Mobile Subscriber Identifier IMSI. This IMSI is a unique identification of a SIM card present in the mobile station 2(i). This IMSI is received by the mobile switching center MSC from the mobile station 2(i). Note, that no SIM card need be present in the mobile station 2(i) for setting up an emergency call. If no SIM card is present in the mobile station 2(i), then no IMSI is available in the MSC. A definition of the IMSI can be found in 3GPP TS 23.003 [3]. It is observed that the transport of both IMEI and IMSI over ISUP is not standard. However, the ISUP flow allows transport of so-called Generic Numbers GN. Generic Numbers GN may be used for transporting both the IMEI and the IMSI. A Generic Number GN contains a Number Qualifier, as specified in ITU-T Recommendation Q.763 [5]. In this ITU-T Recommendation certain Number Qualifier value ranges are defined that may be used for national purposes. These values may be used for the transport of IMSI and IMEI. To that end, a national number qualifier value may be allocated to IMSI and another national number qualifier value may be allocated to IMEI. Of course, Generic Numbers GN may also be used to transport other relevant parameters over ISUP to the emergency center EC.

Global Call Reference Number GCRN. The GCRN is a sequential number generated by the mobile switching center MSC. In an embodiment, the mobile switching center MSC combines the GCRN with an address of the mobile switching center MSC (MSCA, see below) to form a globally unique identifier of the telephone call set up between the mobile station 2(i) and the emergency center EC. The inclusion of GCRN and MSCA in the ISUP flow may be done today already. It is undergoing standardization in 3GPP.

A mobile switching center address MSCA. In an embodiment, the MSCA is combined with the GCRN to form a globally unique identifier of the telephone call, as indicated above.

It is observed that all these elements, except IMSI, are available in the mobile switching center MSC in any case. So, they can be easily transported to the emergency center EC, where they may be used for increased service level. If the emergency call is established from a mobile station 2(i) without SIM card, then no IMSI is available in the mobile switching center MSC. In that case, no IMSI can be transported to the emergency center EC.

In action 3E1, the emergency center EC receives all the information that is sent in action 3M3 by the mobile switching center MSC.

In action 3E3, the processor in the emergency center EC displays at least a graphical map with the raw location information via, e.g., a monitor to an operator. This raw location information is derived by processor in the emergency center from at least one of the Location Number LN, the Cell Global Identifier CGI, the Service Area Identifier SAI, and the Geodetic Information GI received from the mobile switching center MSC. The raw location information may then be displayed, e.g., as a circle or ellipse on a graphical map that corresponds with the communication cell in which the mobile station 2(i) is located. This raw location information may be used by the operator to direct the staff of any help service to the place where the mobile station 2(i) is located at that moment. Moreover, the processor in the emergency center EC may display other elements, like the calling party number, the IMSI, and the IMEI (if available).

Simultaneously with establishing the emergency call between the mobile station 2(i) and the emergency center EC, the mobile switching center MSC invokes an Intelligent Network IN service to be started in the service control point SCP, as indicated in action 3S1. To that end, a Service Switching Function SSF is used in the mobile switching center MSC. In an Ericsson mobile switching center MSC such a SSF is, e.g., located in a service switching function application module SSFAM. Such a SSFAM may initiate a Customized Application for Mobile network Enhanced Logic CAMEL dialog with the service control point SCP.

Preferably, the invocation is performed in a so-called "notification mode". I.e., the Intelligent Network trigger in the mobile switching center MSC is defined as a Trigger Detection Point-Notify "TDP-N". Such a TDP-N has the effect that the requested Intelligent Network IN service is invoked without giving that IN service control over the emergency call itself. To invoke the IN service, the mobile switching center MSC sends call-related information to the IN service and then continues the processing of the emergency call between the mobile station 2(i) and the emergency center EC, i.e., the mobile switching center MSC does not wait for the service control point SCP to send an instruction to the mobile switching center MSC indicating that the mobile switching center MSC may continue the emergency call processing.

In an embodiment, the call-related information sent by the mobile switching center MSC to the IN service may include at least one of the following information elements:
  a called party number. This called party number is the number that is used by the mobile switching center MSC to establish the call to the emergency center EC;
  the location number LN;
  the Cell Global Identifier CGI and/or Service Area Identifier SAI;
  the International Mobile Subscriber Identifier IMSI, if available;
  the Mobile Subscriber ISDN (MSISDN), if available. This MSISDN is the telephone number of a GSM mobile telephone. This MSISDN is stored in the SIM card inside the mobile phone. Thus, if no SIM card is present in the mobile telephone, the MSISDN is not available.
  the International Mobile station Equipment Identity IMEI;
  the Global Call Reference Number GCRN;
  the mobile switching center address MSCA.

The IN service in the service control point SCP searches for the following information in the following way:
  the IN service requests accurate location information of the mobile station 2(i) concerned from the GMLC. To that end, it sends the MSISDN or the IMSI and possibly also the mobile switching center address MSCA to the GMLC. By using the information received from the IN service, the GMLC provides the requested accurate location information. Techniques, like paging, used by the GMLC to measure this accurate position are known to persons skilled in the art. The GMLC may be any known system. If neither the MSISSDN nor the IMSI is available, the IN service may include the IMEI and the mobile switching center address MSCA in the information flow to the GMLC.
  the IN service searches the MNP database by means of either the MSISDN or the IMSI. The MNP database responds by sending information regarding the home operator of the mobile station 2(i);
  the IN service searches in the EIR database by sending the IMEI. The EIR database sends the IMEI status in return, relating to, e.g., black-listed, grey-listed, or white-listed;
  the IN service searches for a fraud status by sending the MSISDN to the FIGS system. The FIGS system responds by sending information regarding whether the subscriber is listed as having committed (or is suspected of) fraud or not;
  the IN services searches in the CNAP database by sending the MSISDN. The result that is obtained is the name of the subscriber of the calling mobile station 2(i).

Preferably, as soon as any information from either one of the GMLC, the MNP database, the EIR database, the FIGS system, or the CNAP database becomes available, that information is transferred by the service control point SCP to the emergency center EC, as indicated by action 3S3. Preferably, that information is transmitted through the Internet via communication network 6. It is observed that the service control point SCP may have stored a list in which for each mobile switching center MSC one or more emergency centers with their IP address are stored. Then, upon receiving an invocation for an IN service in accordance with the present invention, the service control point SCP reads this stored IP address of the emergency center that is associated with the mobile switching center MSC concerned and knows where the retrieved information is to be sent to. Moreover, if the emergency center EC listed as number one in that list does not respond to any information sent by the service control point SCP, the service control point SCP may decide to transmit the retrieved information to the second listed emergency center EC. Alternatively, the IP address of the emergency center EC may be transmitted by the mobile switching center MSC, while invoking the IN service.

In the embodiment above, it has been assumed that the service control point SCP initiates searching for the additional information in the GMLC, the MNP database, the EIR database, the FIFS system or the CNAP database after being triggered by the Intelligent Network invocation as received from the mobile switching center MSC. However, in an alternative embodiment, the emergency center EC sends an express request to that effect to the service control point SCP after having received the information from the mobile switching center MSC as indicated in action 3E1. Then, the service control point SCP only starts searching for the additional information after having received such a request from the emergency center EC, and then sends the additional information to the emergency center for display to the operator there.

In action 3E5, the emergency center EC receives any additional information from the service control point SCP. It is observed that some information as transmitted by the service control point SCP is additional information when compared to the information already received from the mobile switching center MSC. Other information may be more accurate than the information already being received by the emergency center EC, like the position of the mobile station 2(*i*).

The information as sent by the mobile switching center MSC to the emergency center EC may contain a unique identifier. This unique identifier is also used in the information sent by the service control point SCP. This unique identifier may be the Global Call Reference Number GCRN referred to above. Moreover, in addition to the GCRN the MSCA may be used in this unique identifier. The emergency center EC may use this unique identifier to correlate the information received from the service control point SCP to the information received from the mobile switching center MSC. Thus, for instance, the processor within the emergency center EC is able to substitute the raw location data with respect to the position of the mobile station 2(*i*) by the more accurate location data received from the service control point SCP, once having received this latter information. Thus, while the operator may already be talking to the user of the mobile station 2(*i*), he/she may receive more and more accurate data on his/her monitor, which may be of great help in providing assistance. All of the other items in the information received from the service control point SCP may be displayed on the monitor of the operator in the emergency center EC once received. The additional information shown on the monitor to the operator can, e.g., be used by the operator to inform the staff of any help service, like policemen, e.g., that the mobile station 2(*i*) is stolen or is fraud-listed. This may prepare the policemen as to how to approach the user of the mobile station 2(*i*).

Moreover, the information as to the home operator of the subscriber of the mobile station 2(*i*) may be an indication to the operator that the person whom he is talking to may be of, e.g., Hungarian origin. Then, the operator may decide to switch the user of the mobile station 2(*i*) to a Hungarian-speaking assistant.

Moreover, if the mobile station 2(*i*) is, e.g., black-listed (i.e., stolen), then the operator may decide to record the conversation in order to assist the police to back-track the use of stolen mobile stations 2(*i*).

When the operator receives the name of the subscriber of the mobile station 2(*i*) concerned, this may help the operator in communicating with the user of the mobile station 2(*i*).

It is observed that, above, reference is made to GSM as a telephone standard in which the invention can be used, however, the invention can be applied in any mobile communication system using any other standard.

ABBREVIATIONS

CAMEL=Customized Application for Mobile network Enhanced Logic
CGI=Cell Global Identifier (used in 2G)
CNAP=Calling Name Presentation
EIR=Equipment Identification Register
FIGS=Fraud Information Gathering System
GCRN=Global Call Reference Number
GI=Geodetic Information
GMLC=Gateway Mobile Location Centre
GSM=Global System for Mobile communications
IDP=Initial Detection Point
IMEI=International Mobile station Equipment Identity
IMSI=International Mobile Subscriber Identity
IN=Intelligent Network
ISUP=ISDN User Part
LN=Location Number
MNP=Mobile Number Portability
MS=Mobile Station
MSC=Mobile Switching Center
MSCA=MSC Address
MSISDN=Mobile Subscriber ISDN
PLMN=Public Land Mobile Network
PSTN=Public Switched Telephone Network
SAI=Service Area Identifier (used in 3G)
SCP=Service Control Point
SIM=Subscriber Identification Module
SS7=Signaling System No. 7
SSF=Service Switching Function
SSFAM=Service Switching Function Application Module
TDP-N=Trigger Detection Point-Notify
VLR=Visitor Location Register

REFERENCES

[1] 3GPP TS 22.003; circuit Teleservices supported by a Public Land Mobile Network (PLMN)
[2] 3GPP TS 22.101; Service aspects; Service principles
[3] 3GPP TS 23.003; Numbering, addressing and identification
[4] 3GPP TS 23.078; CAMEL—technical implementation
[5] ITU-T recommendation Q.763; Signalling System No. 7—ISDN user part formats and codes

The invention claimed is:

1. A method of setting up a telephone connection for a telephone call comprising:
setting up, by a mobile switching center, said telephone connection for said telephone call between a mobile station and an emergency center associated with said mobile switching center;
sending first data including at least raw location data as to where said mobile station is located to said emergency center via said telephone connection;
displaying said first data to an operator in said emergency center;
invoking, by the mobile switching center in notification mode, an Intelligent Network service to start searching for second data relating to said mobile station, including more accurate location data as to where said mobile station is located by means of sending a service invocation request to a service control point;

transferring said second data from said Intelligent Network service by said service control point to said emergency center once said second data becomes available to said service control point;

displaying said second data to said operator in said emergency center once said second data is received from said service control point, wherein said first data comprises first identifying data and said second data comprises second identifying data, said first identifying data and said second identifying data being combined to form a globally unique identifier which is used in said emergency center to correlate said first data and second data to one another.

2. Method according to claim 1, wherein said first data further comprises at least one of the following:
a calling party number;
an International Mobile Equipment Identifier associated with said mobile station;
an International Mobile Subscriber Identifier associated with said mobile station;
a Global Call Reference Number associated with said telephone call; and
a mobile switching center address of a mobile switching center that has set up said telephone connection.

3. Method according to claim 1, wherein said telephone call is based on an Integrated Services Digital Network (ISDN) User Part (ISUP) flow.

4. Method according to claim 1, wherein said invoking said Intelligent Network service comprises sending at least one of the following to the Intelligent Network service:
an International Mobile Equipment Identifier associated with said mobile station;
an International Mobile Subscriber Identifier (IMSI) associated with said mobile station;
a Mobile Subscriber ISDN associated with said mobile station;
a Global Call Reference Number associated with said telephone call;
a mobile switching center address of a mobile switching center that has set up said telephone connection;
a called party number used by a mobile switching center to establish said telephone connection with said emergency center; and
said raw location data.

5. Method according to claim 4, wherein said Intelligent Network service is arranged to perform at least one of the following functions:
to search for said more accurate location data using at least one of said Mobile Subscriber ISDN, International Mobile Subscriber Identification, International Mobile Equipment Identification and said address of said mobile switching center;
to search for home operator information associated with said mobile station using at least one of said Mobile Subscriber ISDN and said International Mobile Subscriber Identification;
to search for an International Mobile Equipment Identification status of said mobile station using said International Mobile Equipment Identification;
to search for a fraud status of said mobile station using said Mobile Subscriber ISDN; and
to search for a name of a person registered as being owner of said mobile station using said Mobile Subscriber ISDN.

6. Method according to claim 1, wherein said first data comprises first identifying data and said second data comprises second identifying data, said first identifying data and said second identifying data being used in said emergency center to correlate said first data and second data to one another.

7. Method according to claim 6, wherein said first identifying data and said second identifying data comprise a call reference number identifying said telephone call and a mobile switching center address of a mobile switching center that has set up said telephone connection.

8. Method according to claim 1, wherein said raw location data comprises at least one of a location number, a cell global identifier, a service area identifier and Geodetic Information.

9. Method according to claim 1, wherein said telephone connection is set up using the public switched telephone network and said second data is sent via the Internet.

10. A system for setting up a telephone connection for a telephone call, the system comprising:
a mobile switching center,
a service control point and
an emergency center associated with said mobile switching center, wherein:
said mobile switching center being arranged to:
set up said telephone connection for said telephone call between a mobile station and said emergency center;
send a service invocation request to said service control point to invoke an Intelligent Network service in notification mode to start searching for second data relating to said mobile station, including more accurate location data as to where said mobile station is located; and
send first data including raw location data as to where said mobile station is located to said emergency center via said telephone connection.
said service control point being arranged to
receive said service invocation request from said mobile switching Center;
start said Intelligent Network service to search for said second data relating to said mobile station, including more accurate location data as to where said mobile station is located; and
transfer said second data from said Intelligent Network service to said emergency center once said second data becomes available;
said emergency center being arranged to:
receive said first data and display said first data to an operator in said emergency center; and
receive said second data from said service control point, correlate it to said first data and display said second data to said operator in said emergency center once said second data is received, wherein said first data comprises first identifying data and said second data comprises second identifying data, said first identifying data and said second identifying data being combined to form a globally unique identifier which is used in said emergency center to correlate said first data and second data to one another.

11. System according to claim 10, wherein
said service control point is arranged to receive a request from an emergency center for said second data and correlate said request with said service invocation request prior to starting said Intelligent Network service, and
said emergency center is arranged to send said request for said second data after having received said first data.

12. System according to claim 10, wherein said service control point comprises a list of IP-addresses of more than one emergency center associated with a mobile switching center, and said service control point being further arranged to send said second data, if said emergency center does not respond to the second data sent from the Intelligent Network service started in response to an invocation by said mobile switching center, instead to a next emergency center associated with said mobile switching center in said list.

13. System according to claim 10, wherein said service control point for searching said second data is connected to at least one of:
- a gateway mobile location center arranged to allow a location information query to be made providing additional information as to the current position of said mobile station;
- a mobile number portability database arranged to allow a query to be made as to information regarding a home operator of a subscriber of said mobile station;
- an equipment identification register arranged to allow a query to be made as to a status of said mobile station;
- a fraud information gathering system arranged to allow a query to be made as to whether a user of said mobile station is a fraud-listed user; and
- a calling name presentation database arranged to allow a query to be made to a name of a subscriber of said mobile station.

14. A mobile switching center arranged to:
set up a telephone connection for a telephone call between a mobile station and an emergency center;
send first data including raw location data as to where said mobile station is located to said emergency center for displaying said first data to an operator in said emergency center, via said telephone connection;
send a service invocation request to a service control point to invoke an Intelligent Network service in notification mode to start searching for second data relating to said mobile station, including more accurate location data as to where said mobile station is located, for displaying to the operator in said emergency center;
wherein said first data comprises first identifying data and said second data comprises second identifying data, said first identifying data and said second identifying data being combined to form a globally unique identifier which is used in said emergency center to correlate said first data and second data to one another.

15. Mobile switching center according to claim 14, wherein said mobile switching center is arranged to send information in an Integrated Services Digital Network (ISDN) User Part (ISUP) flow over said telephone connection with said emergency center.

16. Mobile switching center according to claim 15, wherein said mobile station is associated with an International Mobile station Equipment Identity and said mobile switching center uses a first Number Qualifier value of a Generic Number within said ISUP flow for transporting said International Mobile station Equipment Identity.

17. Mobile switching center according to claim 16, wherein said mobile station is associated with an International Mobile Subscriber Identity and said mobile switching center uses a second Number Qualifier value of said Generic Number within said ISUP flow for transporting said International Mobile Subscriber Identity.

18. A method performed in a mobile switching center, the method comprising:
setting up a telephone connection for a telephone call between a mobile station and an emergency center associated with said mobile switching center;
sending first data including raw location data as to where said mobile station is located, for display to an operator in the emergency center, to said emergency center via said telephone connection;
sending a service invocation request to a service control point to invoke an Intelligent Network service in notification mode to start searching for second data relating to said mobile station, including more accurate location data as to where said mobile station is located, for display to the operator in the emergency center,
wherein said first data comprises first identifying data and said second data comprises second identifying data, said first identifying data and said second identifying data being combined to form a globally unique identifier which is used in said emergency center to correlate said first data and second data to one another.

19. A method performed in an emergency center, the method comprising:
receiving a telephone connection with a mobile station via a mobile switching center;
receiving first data from said mobile switching center, said first data including raw location data as to where said mobile station is located, and displaying said first data to an operator in said emergency center;
requesting second data from said service control point by invoking an Intelligent Network service in notification mode to start searching for second data relating to said mobile station, including more accurate location data as to where said mobile station is located;
receiving said second data from said service control point; and
displaying said second data to said operator in said emergency center once said second data is received,
wherein said first data comprises first identifying data and said second data comprises second identifying data, said first identifying data and said second identifying data being combined to form a globally unique identifier which is used in said emergency center to correlate said first data and second data to one another.

* * * * *

UNITED STATES PATENT AND TRADEMARK OFFICE
CERTIFICATE OF CORRECTION

PATENT NO. : 8,301,111 B2  
APPLICATION NO. : 12/091964  
DATED : October 30, 2012  
INVENTOR(S) : Noldus et al.

Page 1 of 1

It is certified that error appears in the above-identified patent and that said Letters Patent is hereby corrected as shown below:

In the Drawings

In Fig. 1, Sheet 1 of 3, delete "Fig" and insert -- Fig. --, therefor at each occurrence throughout the drawings.

In the Specifications

In Column 3, Line 19, delete "connection." and insert -- connection; --, therefor.

In Column 4, Line 27, delete "mobile land" and insert -- land mobile --, therefor.

In Column 10, Line 52, delete "codes" and insert -- codes. --, therefor.

In the Claims

In Column 12, Line 36, in Claim 10, delete "connection." and insert -- connection; --, therefor.

In Column 12, Line 37, in Claim 10, delete "to" and insert -- to: --, therefor.

Signed and Sealed this  
Twenty-first Day of May, 2013

Teresa Stanek Rea  
*Acting Director of the United States Patent and Trademark Office*